US009075978B2

(12) United States Patent
Schneider et al.

(10) Patent No.: US 9,075,978 B2
(45) Date of Patent: Jul. 7, 2015

(54) SECURE CONFIGURATION OF MOBILE APPLICATIONS (75) Inventors: Juergen Schneider, Ludwigshafen (DE); Paul El Khoury, Walldorf (DE); Sami Lechner, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/453,221

(22) Filed: Apr. 23, 2012

(65) Prior Publication Data
US 2013/0283400 A1 Oct. 24, 2013

(51) Int. Cl.
| G06F 11/00 | (2006.01) |
| G06F 21/33 | (2013.01) |
| G06F 21/57 | (2013.01) |
| G06F 21/30 | (2013.01) |
| G06F 21/35 | (2013.01) |
| H04W 4/00 | (2009.01) |
| H04W 12/06 | (2009.01) |
| H04L 29/06 | (2006.01) |
| H04W 12/10 | (2009.01) |
| G06F 12/14 | (2006.01) |
| H04W 12/02 | (2009.01) |
| G06F 9/445 | (2006.01) |

(52) U.S. Cl.
CPC ............ *G06F 21/335* (2013.01); *G06F 21/572* (2013.01); *G06F 21/305* (2013.01); *G06F 21/35* (2013.01); *H04W 4/003* (2013.01); *H04W 12/02* (2013.01); *H04W 12/06* (2013.01); *G06F 2221/2119* (2013.01); *G06F 8/61* (2013.01); *H04L 63/18* (2013.01); *H04W 12/10* (2013.01)

(58) Field of Classification Search
CPC .. H04W 4/003; G06F 21/572; G06F 11/3051; G06F 21/305; G06F 21/335; G06F 21/35; G06F 2221/2119; G06F 8/61; H04L 63/18; H04L 12/2424; H04L 41/0803
USPC ................................ 726/30, 4; 713/152, 169
See application file for complete search history.

(56) References Cited

U.S. PATENT DOCUMENTS

| 7,308,718 | B1 | 12/2007 | Brookner | |
| 7,877,461 | B1 | 1/2011 | Rimmer | |
| 8,126,963 | B1 * | 2/2012 | Rimmer | 709/203 |
| 2002/0091938 | A1 * | 7/2002 | Hiltunen et al. | 713/200 |
| 2007/0271459 | A1 * | 11/2007 | Gomez | 713/171 |
| 2009/0119773 | A1 * | 5/2009 | D'Amore et al. | 726/21 |
| 2009/0287921 | A1 * | 11/2009 | Zhu et al. | 713/155 |
| 2009/0325565 | A1 * | 12/2009 | Backholm | 455/419 |
| 2010/0241836 | A1 | 9/2010 | Proudler | |
| 2010/0313019 | A1 * | 12/2010 | Joubert | 713/168 |
| 2011/0016320 | A1 * | 1/2011 | Bergsten et al. | 713/170 |

(Continued)

OTHER PUBLICATIONS

European Search Report dated Jan. 8, 2014 from European Patent Application No. EP 13 16 4801, 5 pages.

(Continued)

*Primary Examiner* — Linglan Edwards
*Assistant Examiner* — Gary Gracia
(74) *Attorney, Agent, or Firm* — Fountainhead Law Group PC (57) ABSTRACT

Secure configuration of a mobile application ("app") includes sending the required configuration data for the app to the user's mobile computing device in a communication, for example an email with an attachment. A verification value is included in the attachment to protect the authenticity and integrity of the configuration data. A challenge code is issued to the user (or group of users). The challenge code is used to verify the configuration data.

20 Claims, 8 Drawing Sheets

(56) References Cited

U.S. PATENT DOCUMENTS

| | | | |
|---|---|---|---|
| 2011/0047620 A1* | 2/2011 | Mahaffey et al. | 726/23 |
| 2011/0067097 A1* | 3/2011 | Park et al. | 726/19 |
| 2011/0154456 A1* | 6/2011 | Machani | 726/6 |
| 2012/0017081 A1* | 1/2012 | Courtney et al. | 713/156 |
| 2012/0077482 A1* | 3/2012 | Backholm | 455/419 |
| 2012/0144203 A1* | 6/2012 | Albisu | 713/184 |
| 2012/0246484 A1* | 9/2012 | Blaisdell et al. | 713/189 |
| 2012/0254853 A1* | 10/2012 | Aggarwal et al. | 717/173 |
| 2012/0254949 A1* | 10/2012 | Mikkonen et al. | 726/4 |
| 2012/0260232 A1* | 10/2012 | Hirsch et al. | 717/107 |
| 2013/0024947 A1* | 1/2013 | Holland et al. | 726/28 |
| 2013/0074168 A1* | 3/2013 | Hao et al. | 726/7 |
| 2013/0110721 A1* | 5/2013 | Bogaard | 705/44 |
| 2013/0283377 A1* | 10/2013 | Das et al. | 726/23 |
| 2013/0283397 A1* | 10/2013 | Griffin | 726/28 |
| 2014/0208100 A1* | 7/2014 | Kendall | 713/164 |

OTHER PUBLICATIONS

European Search Report (from a corresponding foreign application), 14154959.2, Mailed May 21, 2014.

* cited by examiner

SECURE CONFIGURATION OF MOBILE APPLICATIONS

BACKGROUND

Unless otherwise indicated herein, the approaches described in this section are not prior art to the claims in this application and are not admitted to be prior art by inclusion in this section.

Mobile applications ("apps") running on mobile computing devices such as smart phones and tablet devices are typically downloaded by users from public application stores ("appstore") available on the Internet. The proliferation of mobile computing devices and their level of computing capabilities have made such devices viable alternatives as remote clients to backend systems. For example, an organization may have several business application systems that support the organizations. Mobile computing devices allow user of the organization (e.g., sales people) to access these backend systems remotely.

Client-side applications for mobile devices can be distributed through an appstore channel just like any other mobile app. Business apps, however, typically require an amount of configuration which app generally do not require. For example, after download and installation on the mobile computing device, a business app may need to be configured with information about the organization's servers ("backend servers"), resource address, and port (typically in the form of a Uniform Resource Locator, URL) and any other additional app-specific configuration information, such as user interface settings, security policy information, and so on. For non-technical users, such configuration details can be difficult to enter manually into the app, time-consuming, error-prone, and thus pose an impediment to broad and fast adoption of any mobile apps the organization may want to push out.

In addition, the integrity and authenticity of such configuration information is crucial for the secure operation of an app and to protect against misuse of personal data, identity, and confidential data processed by the app. For example, if the configuration information is somehow attacked or hacked, the user may inadvertently configure an app to connect to a malicious server without the user's knowledge. When the user enters their login information (e.g., username and password), the hacker will be given information allowing them to break into the real servers in the organization.

DETAILED DESCRIPTION

In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
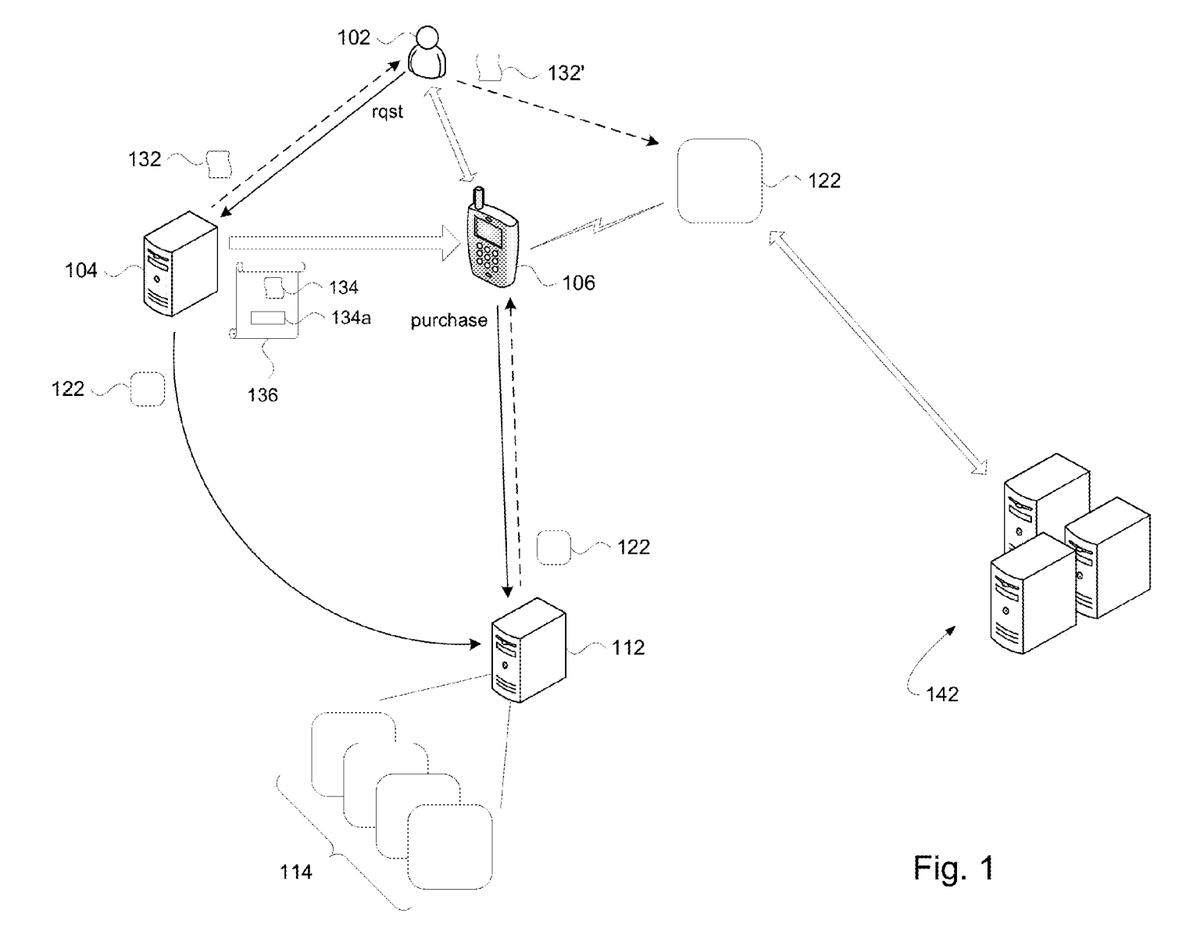
FIG. 1 illustrates an arrangement of components in accordance with the present disclosure.

FIG. 1 shows a typical arrangement for configuring an app in accordance with embodiments of the present disclosure. User 102 represents a user in the organization. The user 102 may have a mobile computing device 106 (e.g., smart phone, computer tablet, and so on) that they use for conducting business on behalf of the organization; e.g., a sales person, a procurement specialist in manufacturing, etc.

The organization may provide and support an application server 104 to provide apps (e.g., app 122) that execute on the user's mobile computing device 106. The application server 104 may upload the app 122 to an appstore server 112 (e.g., Apple® Appstore) which hosts a library 114 of apps for downloading to mobile computing devices such as mobile computing device 106. The organization may provide apps to facilitate planning and scheduling vacations, to review customer records or sales orders, to access customer accounting information, to access production data, and so on. The apps developed for the organization are typically intended to facilitate access to the organization's data stored in the organization's backend servers 142.

The user 102 may interact with the appstore server 112 to purchase the app 122. In some embodiments, the app 122 may be a free download. For example, in the case of an organization wanting to distribute the app to its employees, the app 122 is likely to be free, and so "purchasing" simply means the user 102 downloading the free app from the appstore server 112 to their mobile computing device 106.

The user 102 may interact with the application server 104 to inform the application server that they want to configure an app 122 that they currently have or are planning to install on their mobile computing device 106. For example, configuring the app 122 may involve providing configuration data to the app so that the app can communicate with one or more servers 142 of the organization. In some embodiments, the user 102 makes a request to the application server 104, and in response the application server may provide the user with a challenge code 132. In addition, the application server 104 may send configuration data 134 and a verification value 134a to the user 102 via a communication 136.

When the user 102 retrieves the communication 136 using their mobile computing device 106, the mobile computing device may launch the app 122. As will be explained in more detail below, the user 102 may provide a challenge code 132' to the app 122, which may then verify the configuration data 134. If the configuration data 134 is deemed to be verified, then the app 122 may use the configuration data to conduct communications with the organization's server(s) 142.

Figure 1A:
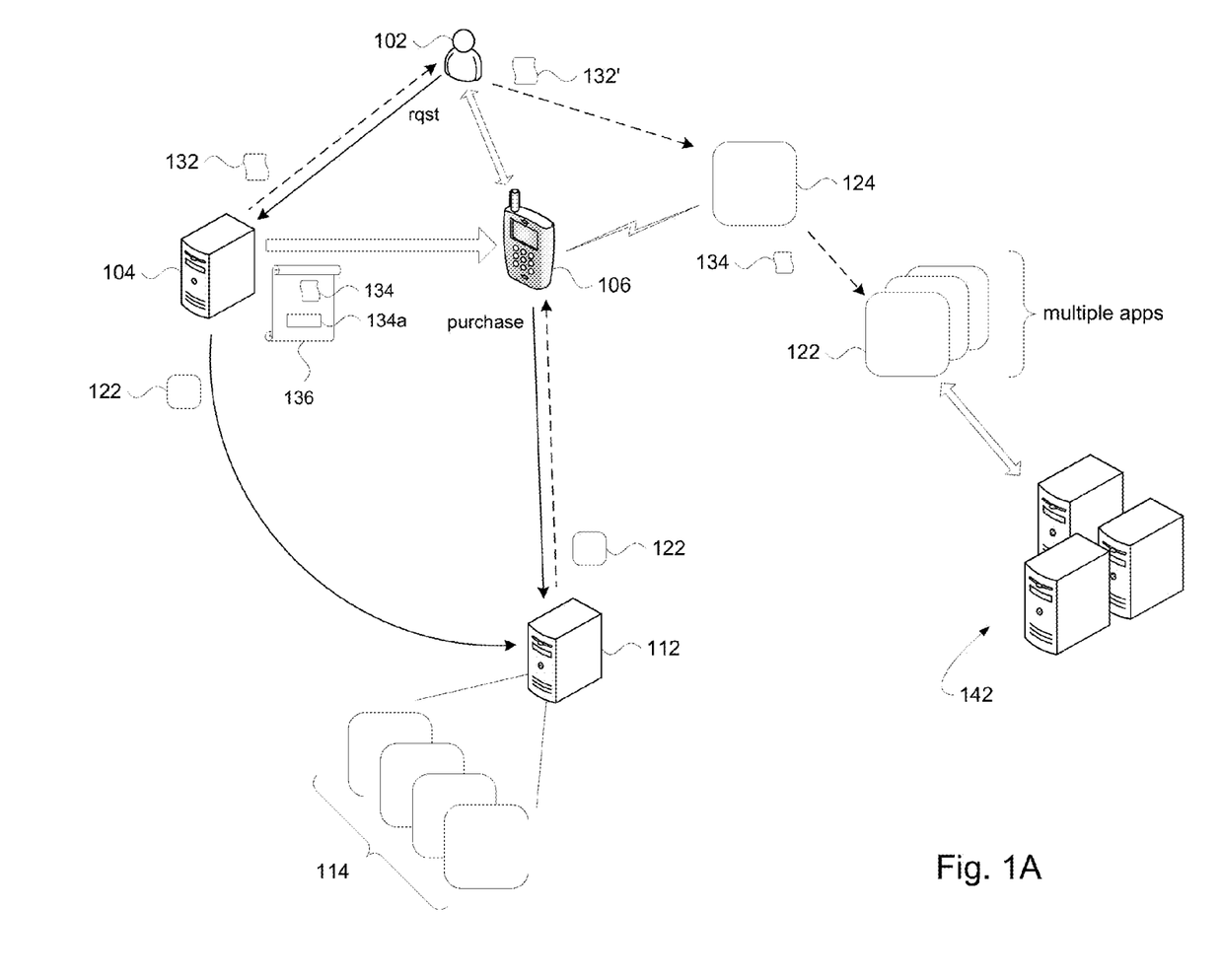
FIG. 1A illustrates an alternative arrangement of components in accordance with the present disclosure.

Referring to FIG. 1A, in some embodiments, a configuration app 124 may be installed on the user's mobile computing device 106. When the user 102 retrieves the communication 136 with their mobile computing device 106, the configuration app 124 may be launched to verify the configuration data 134. If the configuration data 134 is deemed to be verified (e.g., using the user-provided challenge code 132'), then the configuration app 124 may provide the configuration data 134 to the app 122, which may then conduct communications with the organization's server(s) 142. In some embodiments, the configuration data 134 may provide information that allows the configuration app 124 to configure multiple apps.

Figure 2:
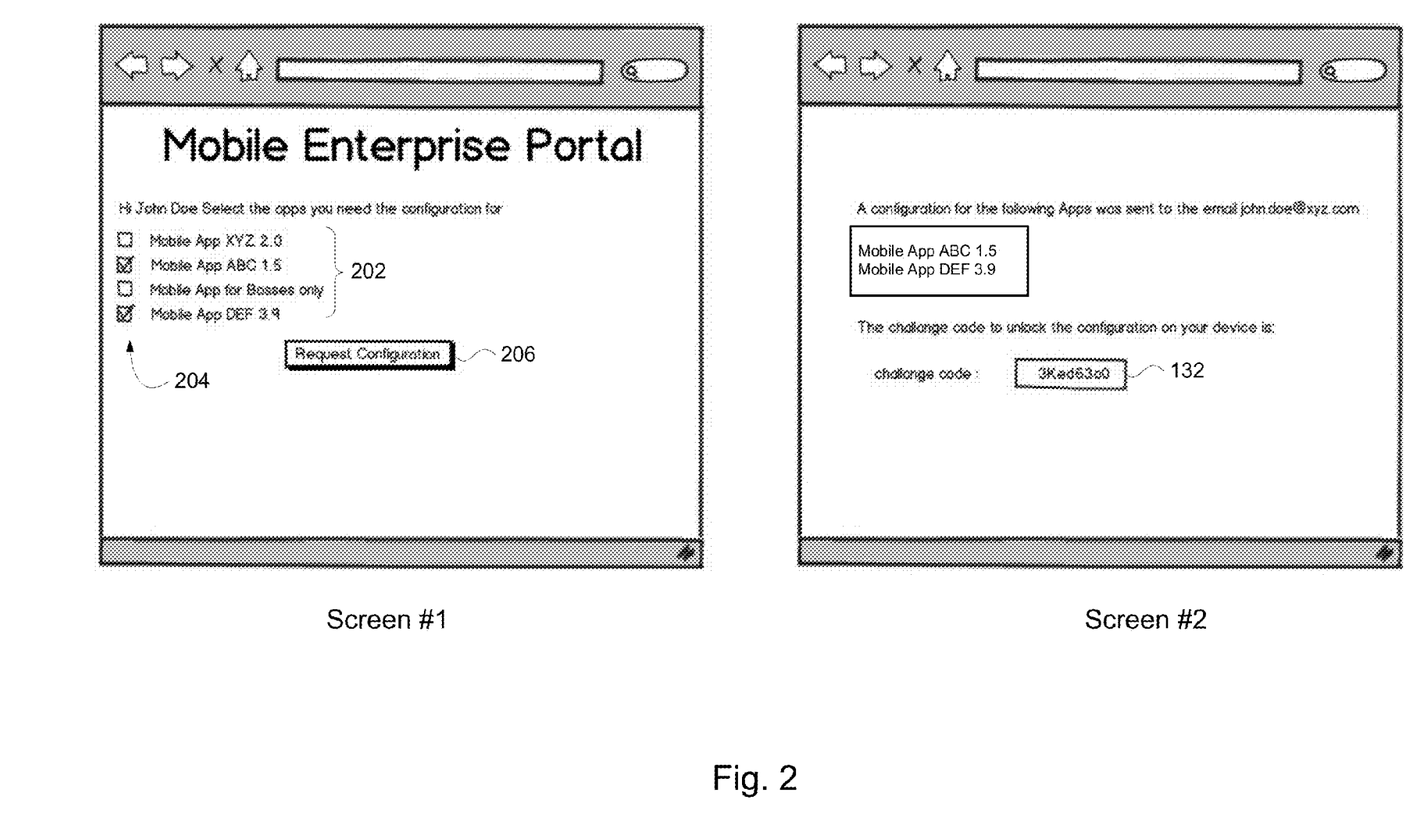
FIG. 2 shows a portal interface that an application server may present to a user.

FIG. 2 shows illustrative examples of a portal interface that the application server 104 may present to the user 102. The application server 104 may be accessed in any of several ways. For example, the application server 104 may be accessed over a local communication network such as a local area network. As another example, the user 102 may access the application server 104 from the Internet using a web browser; e.g., using HTTPS if security is desired.

In Screen #1 of FIG. 2, the portal interface may present to the user 102 a list 202 of apps that the application server 104 supports. For example, the list 202 may include apps that can be downloaded from the appstore server 112. The user 102 may select one or several apps that they want to configure on their mobile computing device 106. For example, a set of check boxes 204 can allow the user 102 to select the apps of interest. The user 102 may then indicate they have completed the selection process, for example, by clicking the "Request Configuration" button 206.

In Screen #2, the portal interface may confirm the selection made by the user 102. In accordance with the present disclosure, the portal interface may display a challenge code 132 to the user 102. The user 102 may then write down the challenge code 132 (e.g., on a piece of paper), the user may store the challenge code on their mobile computing device 106 (e.g., using a notepad program), and so on.

Figure 3:
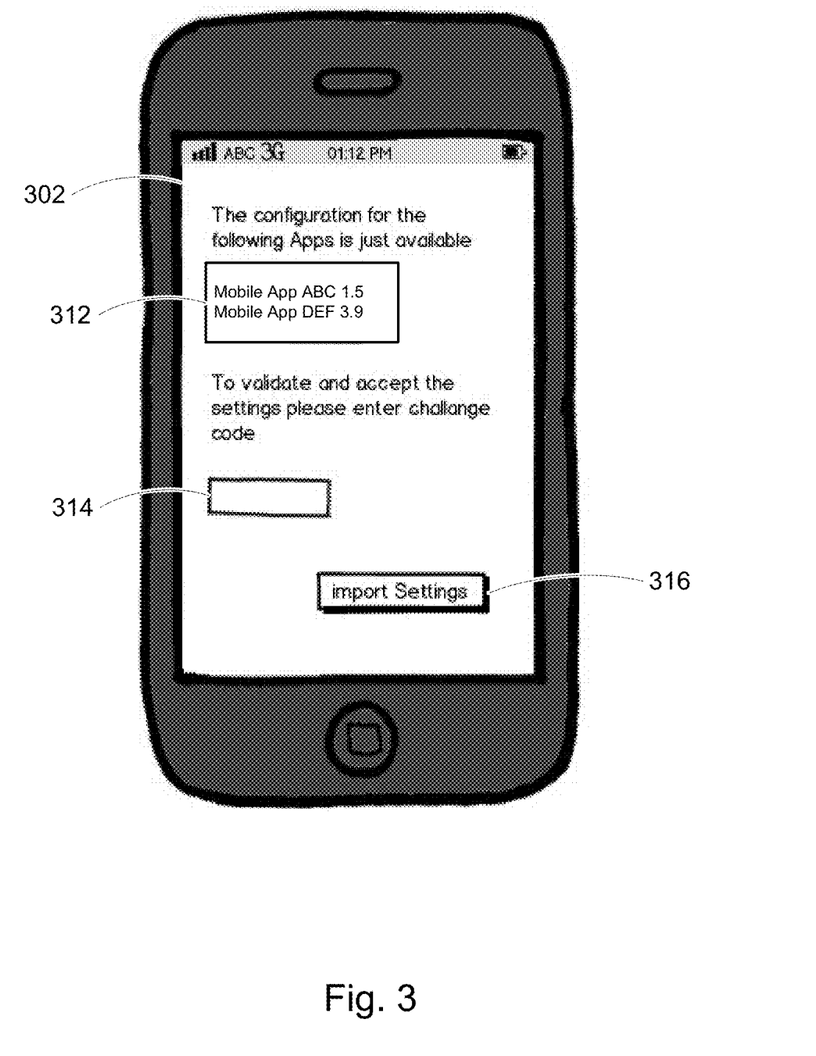
FIG. 3 shows a display that a mobile computing device may present to a user.

FIG. 3 shows an illustrative example of a display 302 that may be presented to the user 102 on their mobile computing device 106, when the user retrieves the communication 136 sent by the application server 104. The display 302 shown in FIG. 3 is an example of a display that the configuration app 124 (FIG. 1A) may display when it is launched. In some embodiments, the user's selection of apps made in FIG. 2 may produce configuration data 134 suitable for configuring the selected apps. In addition, the display 302 may show to the user 102 a list 312 of the user's selected apps that will be configured by the configuration data 134. The display 302 may include an input box 314 for receiving the challenge code 132' from the user 102. A button 316 allows the user 102 to begin the verification process.

Figure 4:
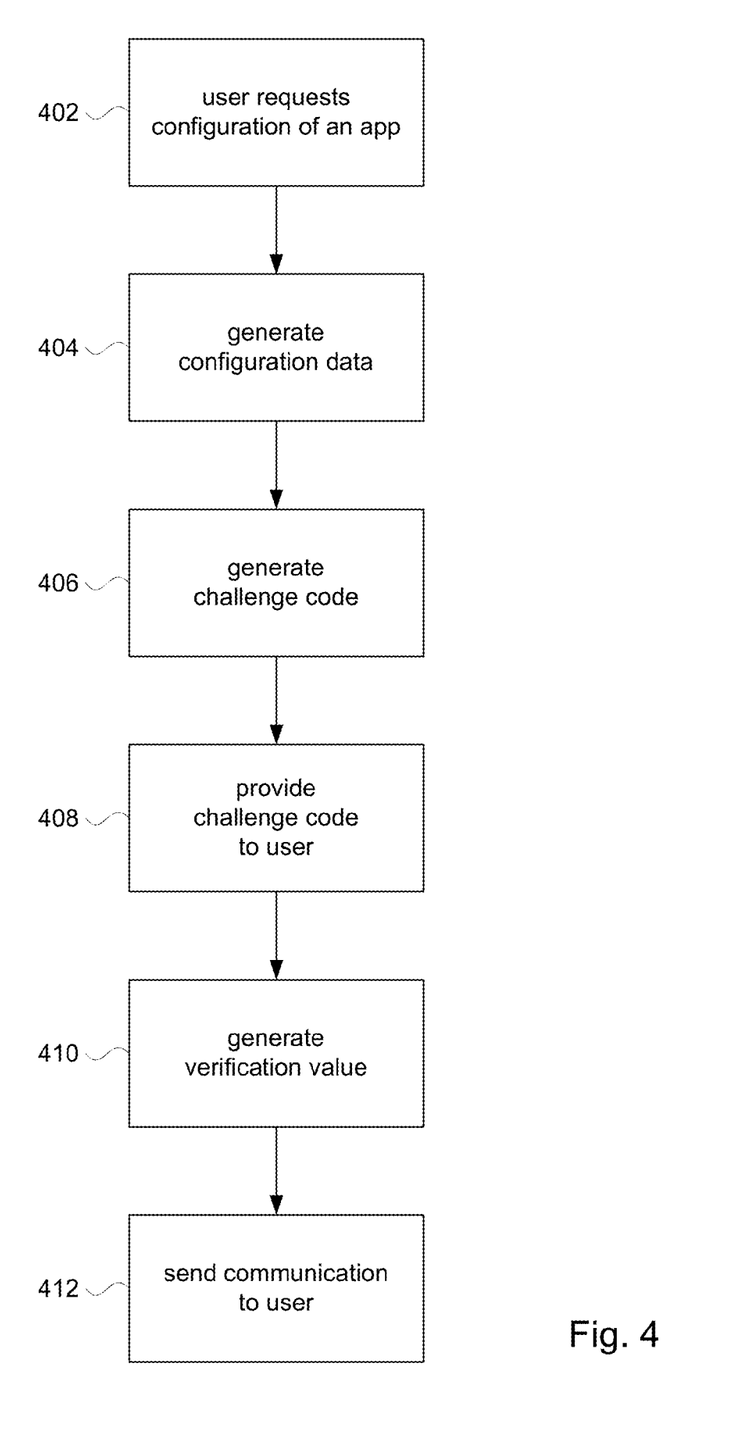
FIG. 4 illustrates an example of processing that may be performed by the application server.

Additional details will now be discussed in the context of processing in accordance with the principles of the present disclosure. Referring to FIG. 4, in a step 402, user 102 may initiate configuration processing for an app on their mobile device 106 using the application server 104. The user 102 may specify one or more apps 122 to be configured; for example, by using an interface such as illustrated in FIG. 2.

In a step 404, the application server 104 may generate configuration data 134 for the one or more apps 122 specified in step 402. The specific information that comprises the configuration data will vary from one app to another. The configuration data 134 may include information that will allow the app 122 to establish a communication link to the servers 142 in the organization, such as server name, IP address, port numbers, and so on. The configuration data 134 may include data security measures such as encryption and decryption keys. The configuration data 134 may configure the app 122 according to who the user 102 is; for example, certain features may be enabled or disabled for a given user. And so on.

In a step 406, the application server 104 may generate a challenge code 132. The challenge code 132 may be a randomly generated number, a random text string, a random string of alphanumeric characters, and in general may include any random string of printable characters. The challenge code 132 may be provided to the user 102 (step 408), for example, by displaying the challenge code on the portal interface shown in FIG. 2. The user 102 may then write down the challenge code 132 to be used later on.

In a step 410, the application server 104 may generate a verification value 134a (FIG. 1) using the challenge code 132 that the application server generated in step 406 and the configuration data 134 generated in step 404. In an embodiment, for example, a hash-based message authentication code (HMAC) may be computed by concatenating the configuration data 134 with the challenge code 132, and feeding the concatenated string into a secure hash function to produce the verification value 134a. Typical secure hash functions include SHA 1 or SHA-256. It will be appreciated of course that the verification value 134a may be produced using any of several known secure hash functions performed on the combination of configuration data 134 and the challenge code 132. Moreover, any deterministic and reproducible combination of the configuration data 134 and the challenge code 132 may be used as input to the secure hash function. The configuration data 134 and the challenge code 132 may be "combined" in any way and order. The configuration data 134 and the challenge code 132 may be concatenated (disclosed above), the configuration data 134 and the challenge code 132 may be encrypted and the resulting ciphers may be combined, and so on. It is noted that the secure hash function used for generating the verification value 134a is a "one-way" function. In other words, applying the same secure hash function to the same combination of configuration data 134 and challenge code 132 will always lead to the same verification value 134a, but the configuration data 134 and the challenge code 132, in particular, cannot be recovered from the verification value 134a.

In a step 412, a communication 136 is sent to the user 102. In accordance with principles of the present disclosure, the communication 136 comprises the configuration data 134 and the verification value 134a. In some embodiments, the communication may be an email message having an attachment. It will be appreciated that other suitable forms of sending the communication 136 to the user 102 may be used. As will be explained in more detail below, the challenge code 132 provided to the user in step 408 may then be used to verify the configuration data 134, but the challenge code 132 itself is not contained in communication 136.

As indicated in the foregoing discussion, in some embodiments there is a one-to-one association between the challenge code 132 and a user; the one user requests a configuration, receives the challenge code, and as will be explained below uses that challenge code to verify configuration data for app 122 on their mobile computing device. In some situations however, it may be more efficient to allow a single challenge code 132 to be used for multiple users. For example, suppose an initial roll-out of an app is targeted for deployment to a large group of users in an organization. A single user (e.g., a department manager) may log onto the application server 104, initiate a request for configuration of the app to be rolled out, and receive a single challenge code 132 (step 408). The application server 104 may then generate the verification value 134a, and the communication 136 comprising the configuration data 134 and the verification value 134a. The application server 104 may be provided with a list of users who are to receive the communication 136 (step 412). The department manager may then distribute the challenge code 132 to the group of users. Each user may then download the app and using the common challenge code 132 verify the configuration data 134 for that app. In this way, only one single challenge code and one verification value need to be generated by the application server 104, rather that generating as many challenge codes and verification values as there are users in the large group of users.

In accordance with principles of the present disclosure, the communication channel over which the application server 104 provides the challenge code 132 to the user 102 is separate from the communication channel over which the communication 136 is delivered to the user. The communication channel over which the challenge code 132 is provided to the user 102 may be deemed to be a trusted channel. For example, the user 102 may interact directly with the application server 104, which is presumably accessed over the organization's intranet, to receive the challenge code 132. The user 102 may receive the challenge code 132 from a colleague (e.g., a department manager may distribute the challenge code to a group of users), and so on. The communication 136, on the other hand, is provided to the user 102 separately, for example, by emailing the communication in an attachment. By using different communication channels to provide the challenge code 132 separately from how the communication 136 is delivered, an additional level of security is provided since it may be difficult to attack or otherwise hack each communication channel.

Figure 5:
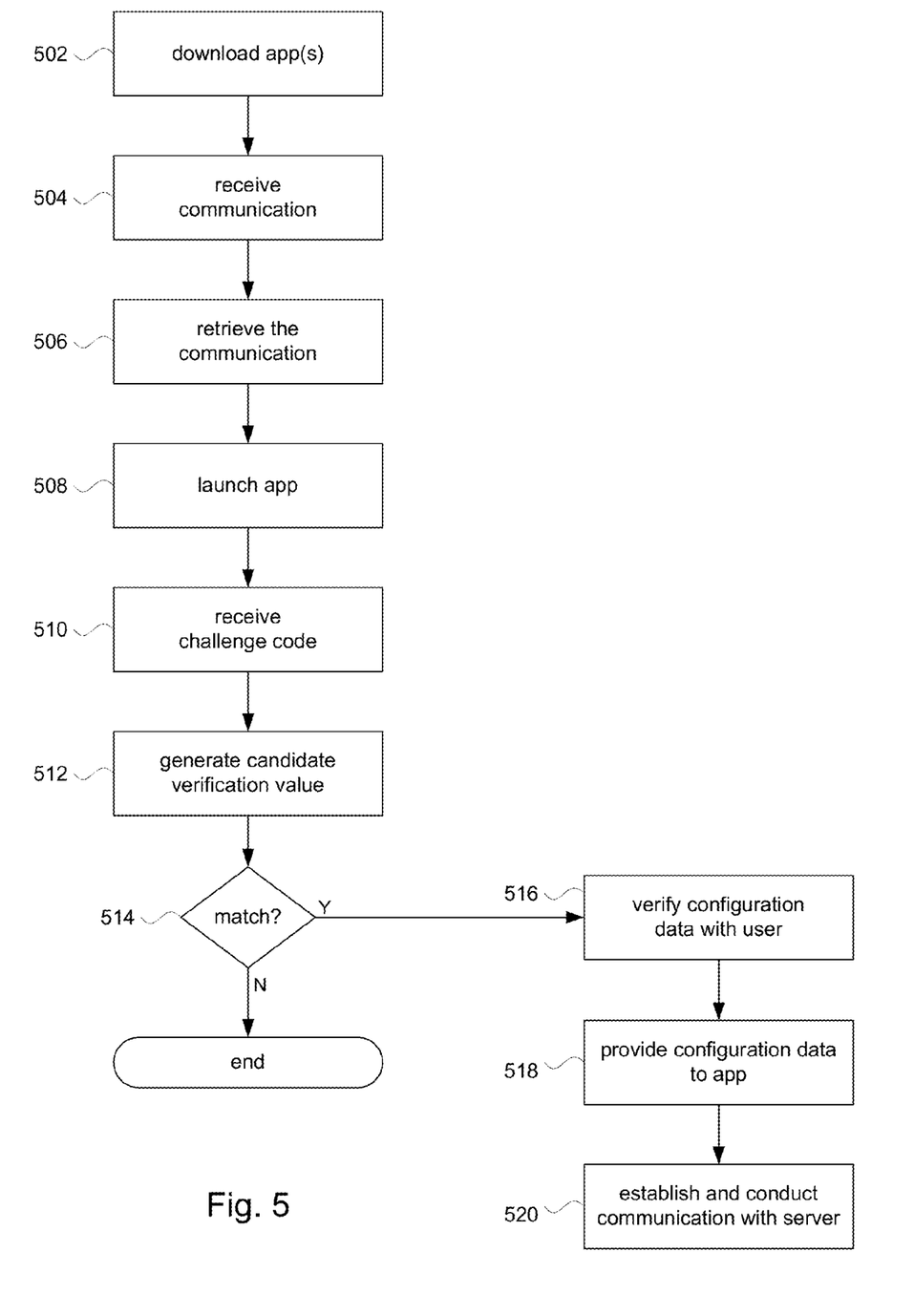
FIG. 5 illustrates an example of processing that may be performed by the mobile computing device.

Referring to FIG. 5, configuration processing in the mobile computing device 106 in accordance with principles of the present disclosure is explained. In a step 502, at some time, the user 102 will purchase the app(s) 122 for which configuration processing is needed. The app 122 may be purchased before the user 102 logs onto the application server 104 to initiate configuration processing, or after the user has logged onto the application server. In the "large group" scenario, the application server 104 may generate the challenge code 132 and send out a communication 136 (step 412) before they even know about the app 122.

In a step 504, the user 102 may receive the communication 136 sent by the application server 104 (step 412). For example, if the communication 136 is an email, the user 102 may be notified that an email has arrived in their mailbox.

In a step 506, the user 102 may retrieve the communication 136 using their mobile computing device. For example, the user 102 may open an email and open an attachment which contains the communication 136. In a step 508, an app that is associated with the attachment may be launched when the user 102 opens the attachment. For example, when an attachment has a file type "PDF", a PDF reader application that is associated with file type PDF can be launched in order to read the attachment. Likewise, the communication 136 has a file type. In some embodiments, the communication 136 may be associated with the app 122 ("target app") that is to be configured, in which case the target app is launched when the user 102 opens the attachment. In another embodiment, the communication 136 may be associated with a configuration app 124 (FIG. 1A), in which case the configuration app is launched.

In a step 510, the app (whether the target app or the configuration app) reads in the data comprising the communication 136. The app may display an input box (e.g., 314, FIG. 3) on the mobile computing device 106 allowing the user 102 to enter the challenge code 132 provided to the user in step 408.

In a step 512, the app (whether the target app or the configuration app) generates a candidate verification value using the configuration data 134 received in the communication 136 and the challenge code received in step 510. In a step 514, if the candidate verification value matches the verification value 134a provided in the communication 136, then the configuration data 134 is deemed to be verified, and processing may proceed to a step 516.

In step 516, the app (whether the target app or the configuration app) may display the configuration data 134 received in the communication 136 to the user 102 on the mobile computing device 106. The user 102 may be prompted to accept or deny the configuration data. This step may be performed as an added measure of security, giving the user 102 the final word whether or not to proceed with using the configuration data 134 to configure the target app.

In a step 518, the now verified communication data 134 may be provided to the target app. In an embodiment where the steps 510-516 are performed by the target app, then the target app simply configures itself with the configuration data 134.

In an embodiment where the steps 510-516 are performed by the configuration app, then the configuration app may provide the configuration data 134 to the target app. The specific details on how the configuration data 134 is provided to the target app depends on the services provided by the operating system (OS) of the mobile computing device 106, and the conventions adopted for providing configuration data to an app. For example, each app may designate a directory or a file in the file system for storing its configuration data. The configuration app 124 may stored the configuration data 134 in those files. The OS may provide interprocess communication services, allowing the configuration app 124 to send the configuration data 134 to the target app using the OS's interprocess communication services.

In a step 520, the target app is now properly configured for communication with the backend servers 142 of the organization. The configuration data 134 may include configuring the target app for secured transmission and reception of data, enabling or disabling certain functionality depending who the user is, and so on.

Figure 6:
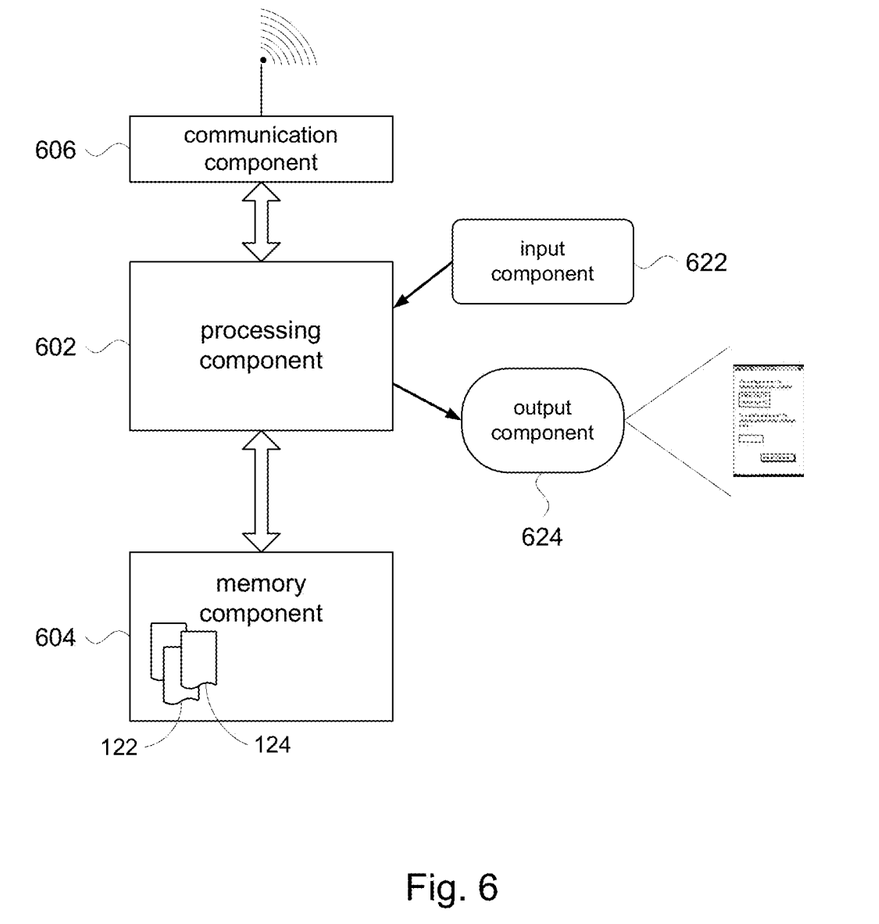
FIG. 6 shows a system block diagram of a mobile computing device in accordance with the present disclosure.

A particular embodiment of a mobile computing device 106 in accordance with the present disclosure is illustrated by the block diagram in FIG. 6. The mobile computing device 106 may comprise a processing component 602 such as a microcontroller. A memory component 604 may comprise static memory (e.g., flash random access memory, RAM) and/or dynamic memory (dynamic random access memory, DRAM). The memory component 604 may store data and apps that can be executed by the mobile computing device 106. For example, the memory component 604 may store app 122, and in some embodiments may store configuration app 124. The apps may cause the processing component 602 to performs steps such as set forth in FIG. 5. A communication component 606 may provide a suitable wireless communication channel to the organization's backend servers 142. The communication component 606 may support several wireless communication formats, including for example, Bluetooth, 3G, and so on.

The mobile computing device 106 may include an input component 622 and an output component 624. In some embodiments, the input component 622 and the output component 624 may be integrated in one component such as a touch-sensitive display. In other embodiments, they may be separate. In accordance with the present disclosure, the processing component 602 may present certain displays on the output component 624. For example, when the processing component 602 executes app 122 or configuration app 124, the output component 624 may present the display illustrated in FIG. 3.

Figure 7:
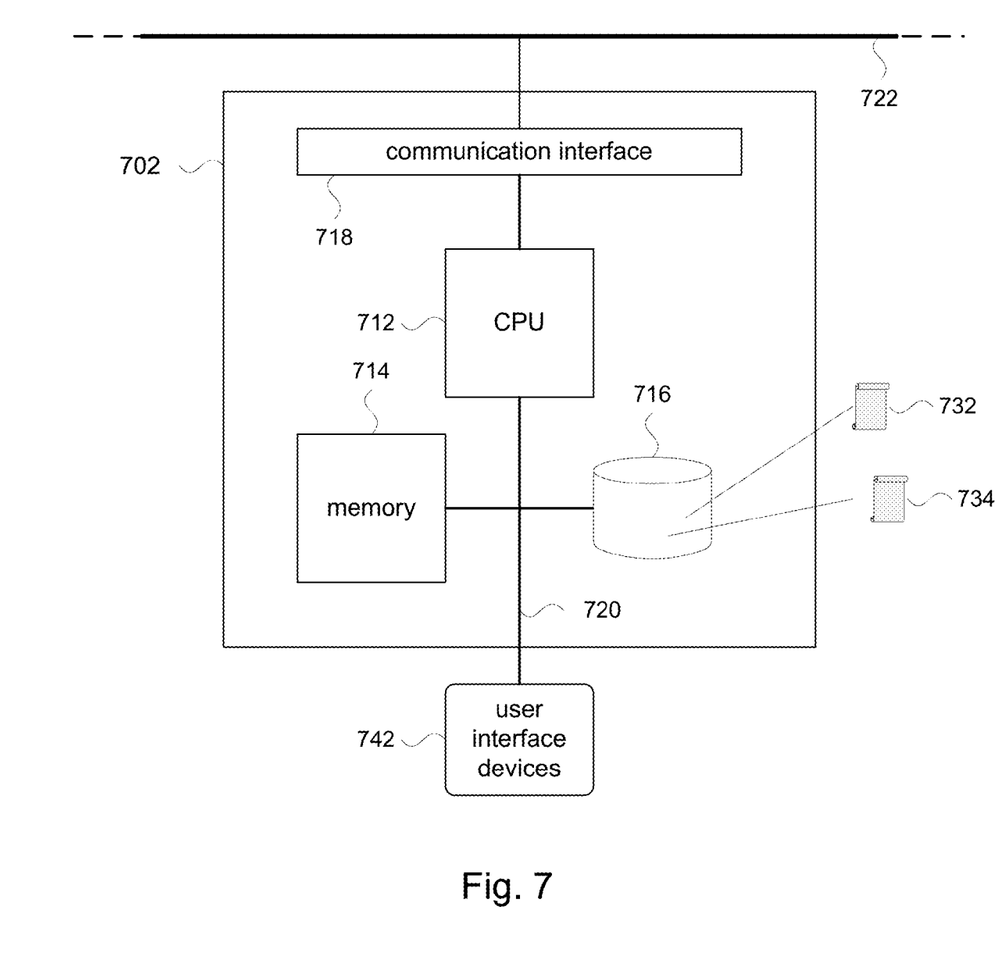
FIG. 7 shows a system block diagram of an application server in accordance with the present disclosure.

A particular embodiment of the application server 104 in accordance with the present disclosure is illustrated by the block diagram of FIG. 7, showing a high level block diagram of a computer system 702 configured to operate in accordance with the present disclosure. The computer system 702 may include a central processing unit (CPU) or other similar data processing component. The computer system 702 may include various memory components. For example, the memory components may include a volatile memory 714 (e.g., random access memory, RAM) and a data storage device 716. A communication interface 718 may be provided to allow the computer system 702 to communicate over a communication network 722, such as a local area network (LAN), the Internet, and so on. An internal bus 720 may interconnect the components comprising the computer system 702.

The data storage device 716 may comprise a non-transitory computer readable medium having stored thereon computer executable program code 732. The computer executable program code 732 may be executed by the CPU 712 to cause the CPU to perform steps of the present disclosure, for example the steps set forth in FIG. 4. The data storage device 716 may store data structures 734 such as object instance data, runtime objects, and any other data described herein. In some embodiments, the data storage device 716 may store the configuration data 134 and the verification value 134a that is to be sent to the mobile computing device.

A user (e.g., user 102) may interact with the computer system 702 using suitable user interface devices 734. They may include, for example, input devices such as a keyboard, a keypad, a mouse or other pointing device, and output devices such as a display.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Advantages and Technical Effect

The present disclosure facilitates provisioning and consumption of required initial configuration data for mobile apps in a way which is simple and easy to use, an important consideration for non-technical users. At the same time, it provides means to verify the authenticity and integrity of this initial configuration data by means of a secret (namely, the challenge code) known only to an authorized user (or authorized group of users), thereby considerably reducing the risk of misuse. An easy-to-use and secure onboarding and initial configuration of mobile apps significantly increases adoption and usage of mobile apps generating business value.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method performed on a mobile computing device comprising:
   generating, by a server system, configuration data for a first mobile application, wherein the configuration data includes data security encryption and decryption keys;
   generating, by the server system a challenge code, and the mobile computing device receiving from the server system a server-generated challenge code via a user interface;
   generating, by the server system a verification value using the challenge code and the configuration data, wherein the configuration data and the challenge code are encrypted and the resulting ciphers are combined;
   receiving, by the mobile computing device from the server system, a first communication that includes configuration data and verification data different from the server-originated configuration data, wherein the verification data is generated from a combination of the configuration data and the server-generated challenge code, wherein the first communication comprises an email message having an attachment, and wherein the attachment comprises the configuration data and the verification data;
   executing, for a user, the first mobile application and displaying an input box allowing the user to enter the challenge code previously provided to the user;
   receiving, by the mobile computing device from the user of the mobile computing device, a user-provided challenge code, wherein the user receives the user-provided challenge code over a trusted communication channel different from a communication channel over which the mobile computing device receives the first communication;
   verifying, by the mobile computing device, the authenticity of the configuration data received from the first communication using the user-provided challenge code, wherein verifying includes generating a candidate verification value from a combination of the configuration data and the user-provided challenge code and comparing the candidate verification value with the verification data received in the first communication, wherein the configuration data is deemed verified when the verification data received in the first communication matches the candidate verification value; and
   when the configuration data is deemed verified, then configuring, by the mobile computing device, the first mobile application using the configuration data.

2. The method of claim 1, wherein a second mobile application, different from the first mobile application, performs the steps of receiving the user-provided challenge code and verifying authenticity of the configuration data.

3. The method of claim 2, wherein providing the configuration data to the first mobile application includes the second mobile application communicating with the first mobile application.

4. The method of claim 2, wherein providing the configuration data to the first mobile application includes the second mobile application storing the configuration data in a data file that can be accessed by the first mobile application.

5. The method of claim 1, wherein the first mobile application performs the steps of receiving a user-provided challenge code and verifying authenticity of the configuration data, and when the configuration data is deemed verified then the first mobile application uses the configuration data to establish and conduct communications with the server system.

6. The method of claim 1, wherein the verification data in the first communication is a hash-based message authentication code (HMAC) produced by applying a secure hash function to a combination of the configuration data with the server-provided challenge code.

7. The method of claim 1, wherein the configuration data is used by the first mobile application to establish and conduct communications with a server.

8. The method of claim 1, wherein the mobile computing device is one of a plurality of mobile computing devices, wherein the server-provided challenge code is a single server-provided challenge code that is received by each of the plurality of mobile computing devices.

9. The method of claim 1, wherein the mobile computing device is one of a plurality of mobile computing devices, wherein the server-provided challenge code is a single server-provided challenge code that is received by each of the plurality of mobile computing devices, and wherein the verification data is one verification value that is received by each of the plurality of mobile computing devices.

10. The method of claim 1, wherein the user receives the user-provided challenge code over the trusted communication channel by directly interacting with the server system over an organization's intranet.

11. The method of claim 1, wherein another user receives the user-provided challenge code over the trusted communication channel by directly interacting with the server system over an organization's intranet, and wherein the user receives the user-provided challenge code from the other user.

12. A system including a mobile computing device comprising:
a data processor; and
a data storage device having stored thereon computer executable program code,
the computer executable program code, when executed by the data processor, causes the data processor to:
generate, by a server system, configuration data for a first mobile application, wherein the configuration data includes data security encryption and decryption keys;
generate, by the server system a challenge code, and receive from the server system by the mobile computing device a server-generated challenge code via a user interface;
generate, by the server system a verification value using the challenge code and the configuration data, wherein the configuration data and the challenge code are encrypted and the resulting ciphers are combined;
receive from the server system a first communication that includes configuration data and verification data different from the server-originated configuration data, wherein the verification data is generated from a combination of the configuration data and the server-generated challenge code, wherein the first communication comprises an email message having an attachment, and wherein the attachment comprises the configuration data and the verification data;
execute, for a user, the first mobile application and displaying an input box allowing the user to enter the challenge code previously provided to the user;
receive, from the user of the mobile computing device, a user-provided challenge code, wherein the user receives the user-provided challenge code over a trusted communication channel different from a communication channel over which the mobile computing device receives the first communication;
verify the authenticity of the configuration data received from the first communication using the user-provided challenge code, wherein verifying includes generating a candidate verification value by applying the secure hash function to a combination of the configuration data and the user-provided challenge code and comparing the candidate verification value with the verification data received in the first communication, wherein the configuration data is deemed verified when the verification data received in the first communication matches the candidate verification value; and
when the configuration data is deemed verified, then the mobile computing device configuring the first mobile application using the configuration data.

13. The system of claim 12, wherein the computer executable program code is a second mobile application different from the first mobile application.

14. The system of claim 13, wherein the second mobile application communicates with the first mobile application to provide the configuration data to the first mobile application.

15. The system of claim 13, wherein the second mobile application stores the configuration data in a data file that can be accessed by the first mobile application.

16. The system of claim 12, wherein the first mobile application comprises the computer executable program code.

17. The system of claim 12, wherein the verification data in the first communication is a hash-based message authentication code (HMAC).

18. The system of claim 12, wherein the configuration data is used by the first mobile application to establish and conduct communications with a server.

19. A non-transitory computer readable storage medium having stored thereon computer executable program code, which when executed by a mobile computing device, causes the computer to perform steps of:
generating, by a server system, configuration data for a first mobile application, wherein the configuration data includes data security encryption and decryption keys;
generating, by the server system a challenge code, and the mobile computing device receiving from the server system a server-generated challenge code via a user interface;
generating, by the server system a verification value using the challenge code and the configuration data, wherein the configuration data and the challenge code are encrypted and the resulting ciphers are combined;
receiving from the server system a first communication that includes configuration data and verification data different from the server-originated configuration data, wherein the verification data is generated from a combination of the configuration data and the server-generated challenge code, wherein the first communication comprises an email message having an attachment, and wherein the attachment comprises the configuration data and the verification data;
executing, for a user, the first mobile application and displaying an input box allowing the user to enter the challenge code previously provided to the user;
receiving from the user of the mobile computing device a user-provided challenge code, wherein the user receives the user-provided challenge code over a trusted communication channel different from a communication channel over which the mobile computing device receives the first communication;

verifying the authenticity of the configuration data received from the first communication using the user-provided challenge code, wherein verifying includes generating a candidate verification value from a combination of the configuration data and the user-provided challenge code and comparing the candidate verification value with the verification data received in the first communication, wherein the configuration data is deemed verified when the verification data received in the first communication matches the candidate verification value; and when the configuration data is deemed verified, then configuring, by the mobile computing device, the first mobile application using the configuration data.

20. The non-transitory computer readable storage medium of claim 19, wherein a second mobile application, different from the first mobile application, performs the steps of receiving the user-provided challenge code and verifying authenticity of the configuration data.

* * * * *